United States Patent [19]
Astheimer et al.

[11] Patent Number: 4,961,121
[45] Date of Patent: Oct. 2, 1990

[54] AIR BEARING SLIDER RAIL DESIGN WITH TRUMPET-SHAPED RAIL PORTION

[75] Inventors: Hans Astheimer, Winterbach; Hans Friedmann, Nierstein; Hubert Schuy, Main-Drais, all of Fed. Rep. of Germany

[73] Assignee: International Business Machines Corporation

[21] Appl. No.: 241,678

[22] Filed: Sep. 7, 1988

[30] Foreign Application Priority Data

Sep. 22, 1987 [EP] European Pat. Off. ........ 87113907.7

[51] Int. Cl.$^5$ .......................... G11B 5/60; G11B 17/32
[52] U.S. Cl. ....................................... 360/103; 360/104
[58] Field of Search ....................... 360/102, 103, 104; 29/603

[56] References Cited

U.S. PATENT DOCUMENTS

| | | | |
|---|---|---|---|
| 4,333,229 | 6/1982 | Ellenberger | 29/603 |
| 4,473,855 | 9/1984 | Plotto et al. | 360/103 |
| 4,475,135 | 10/1984 | Warner et al. | 360/103 |
| 4,555,739 | 11/1985 | Le Van et al. | 360/103 |
| 4,673,996 | 6/1987 | White | 360/103 |
| 4,734,803 | 3/1988 | Nishihira | 360/103 |

FOREIGN PATENT DOCUMENTS

| | | | |
|---|---|---|---|
| 0015383 | 1/1982 | European Pat. Off. . | |
| 0129336 | 12/1984 | European Pat. Off. . | |
| 165724 | 7/1987 | Japan | 360/103 |

Primary Examiner—David J. Severin
Attorney, Agent, or Firm—Otto Schmid, Jr.

[57] ABSTRACT

An air bearing slider for supporting a transducer is provided with a pair of rails having an air bearing surface with a continuously curved part with its greatest width at the leading end of the slider. In the rear area of the slider the air bearing surfaces are of equal width. The invention furthermore provides a mechanical grinding process using a grinding wheel having two grinding disks separated by a spacer disk and provided with bevelled grinding surfaces on its inner sides. Either by advancing the turning grinding wheel parallel to the surface of the slider from the trailing towards the leading end up to a certain point or in accordance with another embodiment by tilting the slider slightly towards the advance motion and continuously advancing the grinding wheel, the continuously curved air bearing surface portions are provided in a simple and efficient manner.

6 Claims, 3 Drawing Sheets

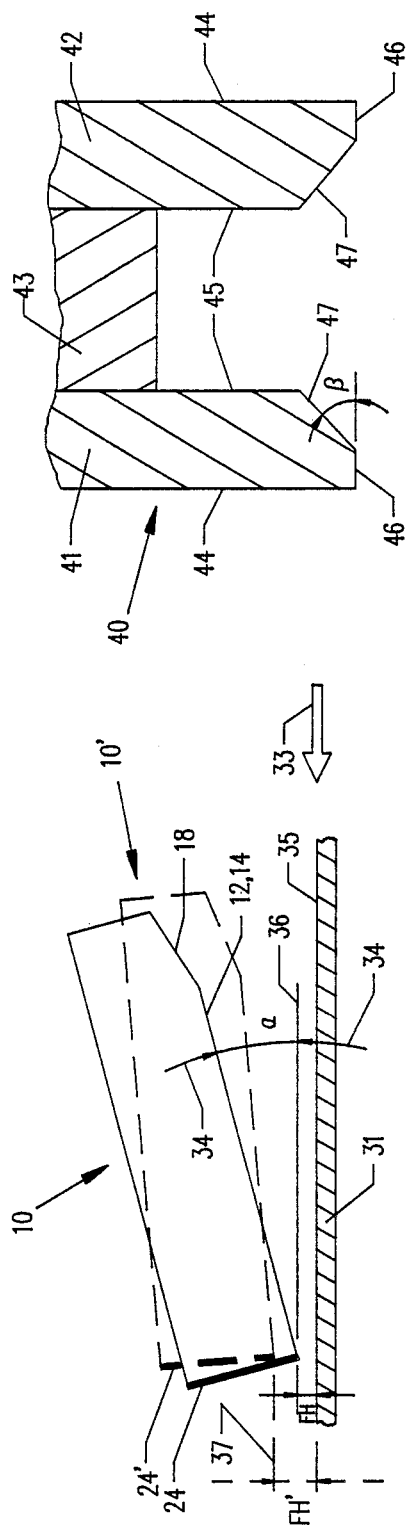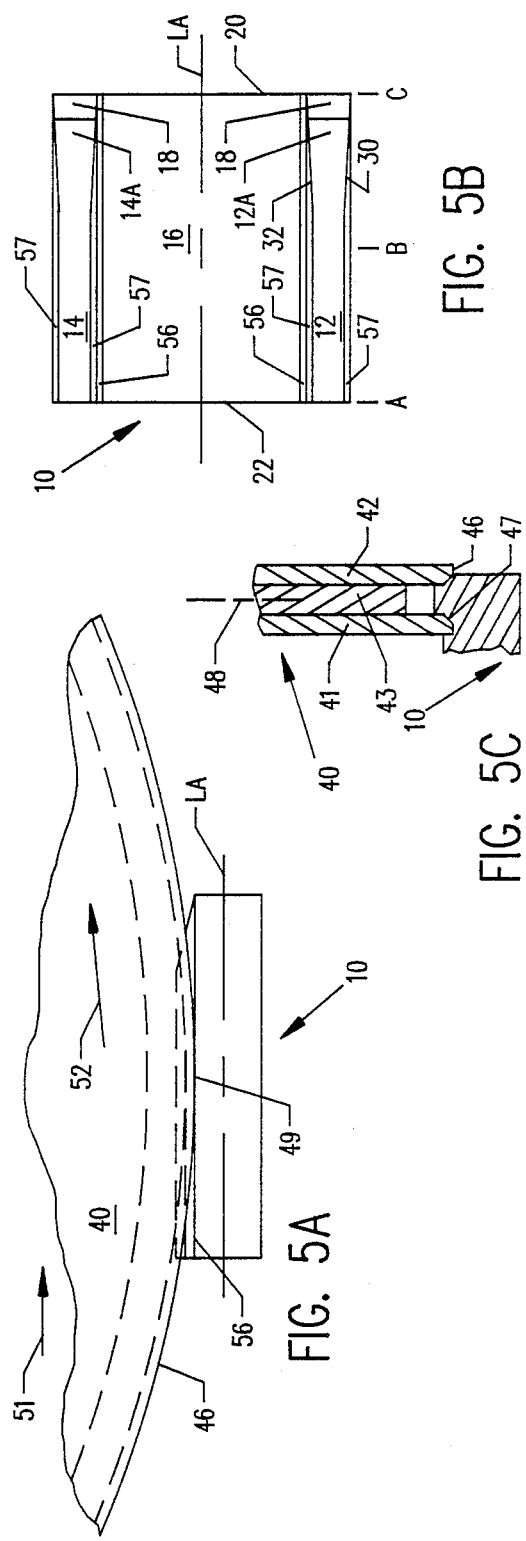

AIR BEARING SLIDER RAIL DESIGN WITH TRUMPET-SHAPED RAIL PORTION

BACKGROUND OF THE INVENTION

1. Field of the Invention

The present invention relates to an air bearing slider for supporting a transducer relative to a moving record medium, and to a method for producing the slider by a grinding process.

2. Description of the Prior Art

U.S. Pat. No. 4,475,135 describes a self-loading magnetic head air bearing slider having a taper across the full width at its leading edge. The slider has two rails along its sides and a recess between the rails. The structure of the rails is flared, so that the rail is wider at the trailing portion of the slider than in the portions closer to the leading edge. The structure and working principle is completely different from the design of the present invention.

European Patent No. 0015383 shows an example (FIG. 2) of a similar rail structure to the one described above. Behind a rail taper at the leading portion and at a cross front portion connecting the two rails, the surface of the rails on their inner opposite edges are tapered so that the rail is widest at the trailing edge where the transducer is provided. This design again is structurally completely different from the one of the present invention.

Published European Patent Application No. EP 0129336 shows a three rail slider design in which the two outer rails form the air bearing surfaces of the slider and are of continuous width in that both rails edges are parallel to each other. The surfaces are contoured to be rounded toward the outer edges as well as toward the trailing and leading edges. No departure of constant rail width is shown in this patent.

Commonly assigned U.S. Pat. No. 4,734,803 shows an air bearing slider having a rail design that is chamfered at its leading end and that has a leading portion which is wider than an intermediate portion between the leading and trailing portions of the rails. The rail may have a leading portion of constant width, an intermediate portion where the rail becomes progressively narrower to a breakpoint and is then of constant width. Also a flaring toward the trailing edge is shown to make the rail again wider at the transducer position. This design shows no trumpet-like form by which the width of the rail progressively changes on both edges. Also no grinding process and tool is shown for a simple fabrication process.

SUMMARY OF THE INVENTION

The object of the present invention is to have a rail design for an air bearing slider that increases the pitch angle and at the same time lowers the transducer element towards the recording medium to have a lower flight height while at the same time providing a high pitch angle so that the leading part and the main part of the slider will be kept away from the recording medium such as a disk, for avoiding serious head disk interferences.

A further object of the present invention is to provide a mechanical grinding method for providing the special rail design by a simple and economically working grinding process.

The foregoing object were solved and the drawbacks of the known rail designs and producing methods are overcome by an air bearing slider for supporting a transducer relative to a moving record medium. The slider is provided on its side directly opposite the recording medium with side rails separated by a recessed portion. The side rails have a tapered portion at the leading end and the air bearing surface has a constant width from the trailing end to a predetermined point between the leading and trailing ends, and a width that increases in a continuously curved form from the predetermined point to the leading end of the slider with the greatest width at the leading end of the slider.

The slider is produced by a method which utilizes a grinding wheel comprising two grinding disks having beveled cutting surfaces at their outer circumference. The two grinding disks are clamped together with a spacer disk in between, and the grinding wheel is advanced from the trailing end of the slider in the direction of the length axis of the slider to a predetermined point chosen so that the leading end of the side rails are maintained in their original width and a continuous curvature is produced on the inner and outer edges of the side rails to a point remote from the leading end of the slider.

The invention provides in advantageous manner an air bearing slider for supporting one or more transducer at its trailing end, the underside of which is provided with two especially designed rails. This especial design provides a parallel rail from the trailing part of the slider towards a point somewhere around the middle of the length of the slider and towards the leading end of the slider a rail of continuously increasing width, having its greatest width at the leading edge of the slider. The form is continuously curved and might be described as trumpet-like or circle like. This form provides a greater air bearing surface in the leading area of the sliders thus having a greater lifting air pressure there which provides a greater pitch angle thus lowering the trailing edge with the transducer. The wider rail surface also provides a slider which is stiffer, more stable, in view of its tendency to roll around the length axis of the slider.

An advantageous mechanical grinding process for providing this advantageous rail form is provided by the invention using a grinding wheel consisting of two grinding disks, preferably diamond disks, which have bevelled cutting surfaces at their outer circumference. Both grinding disks are clamped together with a spacer disk of smaller diameter in between such that the bevelled cutting surfaces are opposite to each other. The grinding wheel is arranged with its plane of rotation normal to the air bearing surfaces of the slider and advanced from the trailing end towards the leading end of the slider parallel to the length of the slider so far that in the trailing part of the slider a rail form having parallel bordering edges is provided and from a certain point on a rail is provided having an increasing width that means that their bordering edges are continuously curved. This is performed in such a way that the grinding wheel is not completely advanced through the slider but only up to a certain point along its length and then retracted towards the trailing edge.

By another embodiment of this grinding process it is possible to have increased ease of manufacturing. In this case the slider is slightly tilted or inclined respectively so that the plane of the rail is not parallel to the direction of advance movement of the grinding wheel. That means that it is tilted such that the grinding wheel can be advanced in one direction only through the entire slider without having the necessity of retracting it. In this case also, as shown in a further embodiment, a plurality of sliders may be tilted in this way and clamped together so that a plurality of sliders can be processed in a continuous operation.

The foregoing and other objects, features and advantages of the invention will be apparent from the following more particular description of a preferred embodiment of the invention as illustrated in the accompanying drawings.

BRIEF DESCRIPTION OF THE DRAWINGS

The invention will be shown in more detail in the following description in accordance with the drawing in which embodiments are shown and in which:

FIG. 3 is a side view showing schematically the relationship between a recording medium such as a disk and a slider with respect to the pitch angle.

FIG. 4 is am enlarged partial section view of the grinding wheel in accordance with the present invention.

FIG. 5A is a side view showing schematically the relation between the slider and the grinding wheel.

FIG. 5B is a plan view of the slider shown in FIG. 5A.

FIG. 5C is a partial section view of the slider shown in FIG. 5A.

DESCRIPTION OF THE PREFERRED EMBODIMENT

Figure 1:
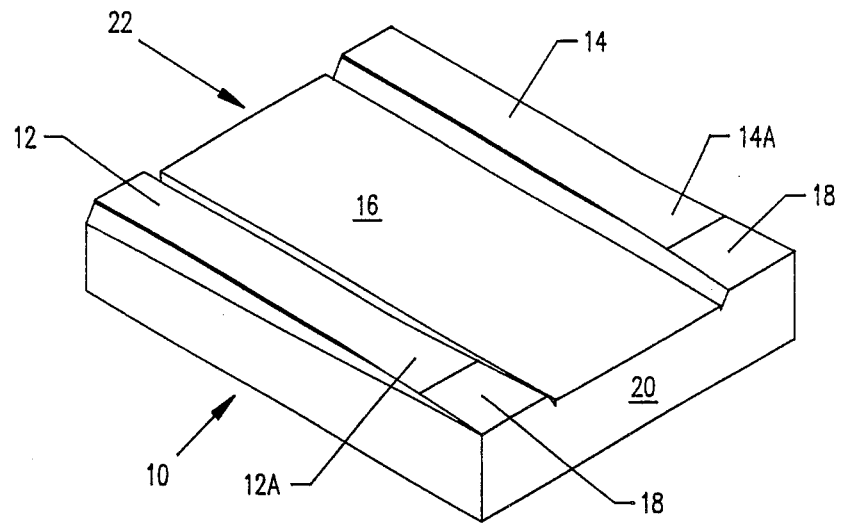
FIG. 1 is a perspective view of a slider provided with rails in accordance with the present invention, as seen from the air bearing surface.

The rail design in accordance with this invention is shown in detail and described now in connection with FIG. 1 and FIG. 2. A magnetic head slider 10 is provided on its side opposite to a recording medium such as a disk (FIG. 3), with two air bearing surfaces 12 and 14. Those air bearing surfaces 12 and 14 are arranged on the side of the slider 10 and are separated by a recessed portion 16 in between. The air bearing surfaces 12 and 14 are provided with a taper 18 close to the leading end 20 of the slider 10. At the trailing end 22 of the slider 10 at least one magnetic transducer 24, preferably of the thin film type, is provided. Those magnetic transducers 24 are provided immediately adjacent to the end of the air bearing surfaces 12 and 14 at the trailing edge 22.

Figures 2A, 2B, 2C:
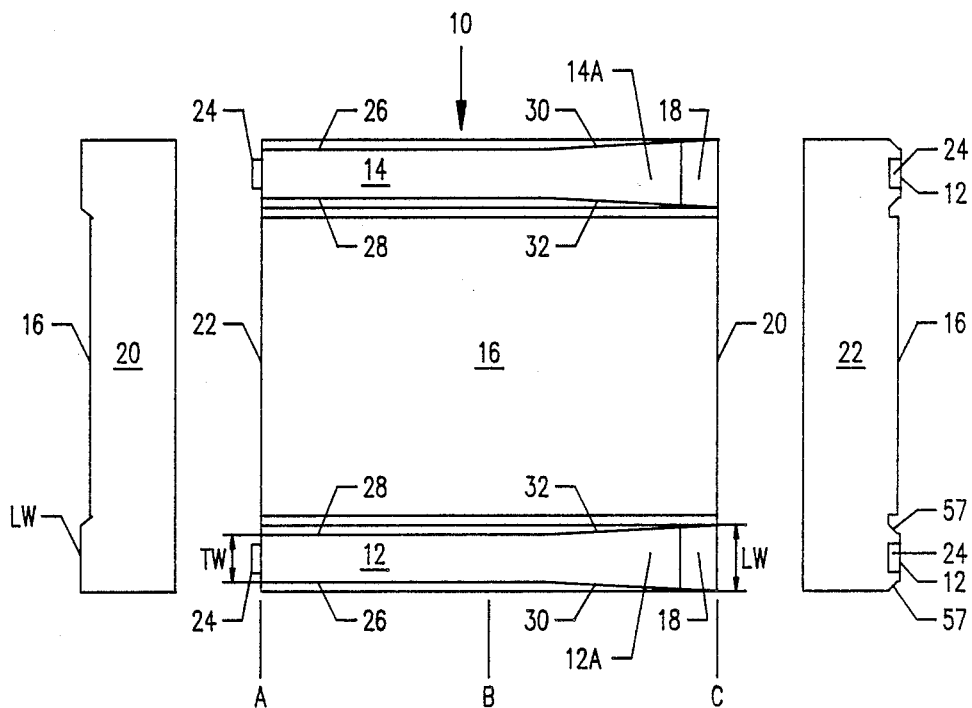
FIG. 2A is a plan view of the slider designed with rails in accordance with the present invention.
FIG. 2B is a side view of the slider shown in FIG. 2A, as seen from the leading end.
FIG. 2C is a side view, as seen from the trailing end of the slider shown in FIG. 2A.

The design in accordance with the present invention for the air bearing surfaces 12 and 14 will be described now in connection with FIG. 2A and FIG. 1 in more detail. Between points A and B in the trailing part of slider 10, the air bearing surfaces 12 and 14 are of constant width TW. The rails are confined by parallel border lines 26 at the outside and 28 on the inside. That means that between border lines 26 and 28 the air bearing surface 12 or 14 respectively has a constant trailing width TW. In between point B and C, which is situated at the leading end 20 of the slider 10, the air bearing surfaces 12 and 14 are confined by border lines 30 at the outside and 32 on the inside. These border lines 30 and 32 are continuously curved in such a way that, seen from point B towards point C the parts 12A and 14A of the air bearing surfaces 12 and 14 have an increasing width. The increase follows the curved line of border line 30 or 32 from point B towards point C. At the leading end 20 of slider 10 the greatest width is reached forming the leading width LW.

The air bearing surfaces 12 and 14 thus have parts between border lines 26 and 28 of constant trailing width TW between points A and B and have with its parts 12A or 14A respectively between border lines 30 and 32 an increasing width, increasing along a curved line in a progressive way, up to the leading width LW. These leading parts 12A and 14A of air bearing surfaces 12 and 14 show a kind of trumpet-like form. These areas 12A and 14A have a larger air bearing surface than the trailing part with the constant width TW, thus increasing the pitch angle $\alpha$ as will be shown later. Furthermore, those areas 12A and 14A of increasing width stabilize the rolling movement of the slider 10 with respect to its length axis LA. The length axis LA is the one parallel to the air bearing surfaces 12 and 14 from point A to point C through the middle of slider 10.

The "trumpet-like" form, generally the form in accordance with the present invention, of air bearing surfaces 12 and 14 have the effect to increase the pitch angle $\alpha$ of the slider as shown schematically in FIG. 3. A slider 10= of conventional rail or surface design respectively is shown in dotted lines. This slider 10= flies over a magnetic recording medium such as a disk 31 which rotates in direction of arrow 33. Between the lower trailing edge, indicated by line 37 and the surface 35 of magnetic disk 31 the flight height FH= is constituted. That means that the transducer element 24= at the trailing end of slider 10= has a distance of FH= between itself and the upper surface 35 of disk 31.

In contrast to a conventional slider 10=, FIG. 3 shows schematically in solid lines the slider 10 with the rails 12 and 14 and the taper 18 as designed in accordance with the present invention. Between the arrows 34 pitch angle $\alpha$ is shown. This angle is formed between a line 36 parallel to surface line 35 of disk 31 and the plane formed by the air bearing surfaces 12, 14. In contrast to the conventional slider 10= the slider 10 designed in accordance with the present invention generates a steeper pitch angle $\alpha$. Thus the flight height FH between transducer element 24 and surface 35 of disk 31 is less than the flight height FH= of the conventional slider 10=.

A further advantage of the rail design of the present invention can also be seen from the schematic view of FIG. 3. With the exception of the lower trailing part of slider 10 with transducer 24, the greater part of slider 10 is spaced farther from upper surface 35 of disk 31 than the body of conventional slider 10=. That means that in case of a head disk interference only a smaller part of slider 10 would touch disk 31 than would be the case with conventional slider 10=.

The rail design in accordance with the present invention and the surface form of air bearing surfaces 12 and 14, as shown in the FIGS. 1, 2 and 3, can be performed by different methods. In accordance with an extremely advantageous, economical, simple and efficient method, the mechanical grinding process for producing this inventive rail design is described in the following part of the description and the respective Figs. of the drawing.

The method in accordance with the invention for producing a slider as designed in accordance with the invention uses a mechanical grinding process. In this grinding process a grinding wheel 40 is used. This grinding wheel 40 is shown schematically in a partial cross section view in FIG. 4. Grinding wheel 40 consists of two diamond grinding disks 41 and 42. These two grinding wheels 41 and 42 are distanced from each other by a spacer disk 43 which has a smaller diameter than the grinding disks 41 and 42. All outer surfaces of the grinding disks 41 and 42, that means outer surface 44, inner surface 45, front surface 46, and bevelled surface 47, are cutting surfaces. For forming the air bearing surfaces 12 and 14 with parts 12A and 14A as shown in FIG. 2, the surfaces 45 and 47 are decisive. Surfaces 45 of disk 41 and disk 42 define the trailing width TW between parallel border lines 26 and 28. The bevelled cutting surface 47 of both disks 41 and 42 define the border lines 30 and 32 in a manner that will be described. The angle $\beta$ between front cutting surface 46 and bevelled surface 47 is in the specific embodiment shown 45 degrees. It might be a different angle dependent on the desired steepness of the side portion of the rails. An angle $\beta$ between 35 and 55 degrees has proven to provide the optimum width increase of the rail portions 12A and 14A.

FIG. 5 shows schematically the relationship between the grinding wheel 40 and the slider 10 in providing the rail surfaces in accordance with the present invention. FIG. 5A shows in a side view slider 10, FIG. 5B shows a bottom view of slider 10 with the rails and air bearing surfaces 12 and 14 and FIG. 5C shows in a cross section part of grinding wheel 40 and its relationship to the two ground portions of slider 10. Grinding wheel 40 is arranged with its plane of rotation 48 normal to the air bearing surfaces 12 and 14. During grinding it rotates for example in accordance with arrow 52 and is advanced in the direction of arrow 51 parallel to the length axis LA of slider 10. The grinding process thus starts at the trailing edge 22 with point A thus creating between border lines 26 and 28 the parallel area of air bearing surfaces 12 and 14.

Grinding wheel 40, for example, in relation to providing air bearing surface 12, is advanced in the direction of arrow 51 with its deepest point 49 on the front cutting surface 46 at its circumference from point A towards point B. During this movement the sloped surfaces 57 are created by the two bevelled cutting surfaces 47. Surface 56 is provided by front cutting surface 46. By advancing grinding wheel 40 with its lowest point 49 from point A to point B the are between point B and point C toward the leading end 20 of slider 10, the cut away portions of the sides 57 get progressively smaller thus forming the trumpet-like form 12A with its curved border lines 30 and 32. Point B is chosen such that at point C the desired width LW, as shown in FIG. 2A is provided. Thus the grinding wheel 40 is not completely advanced through the entire body of slider 10. Instead, it has to be retracted or lifted respectively.

As mentioned before the advance motion of grinding wheel 40 along direction of arrow 51 is parallel to the length axis LA of slider 10. To avoid the somewhat cumbersome retracting or lifting motion of grinding wheel when it has reached point B, another embodiment is provided.

Figure 6:
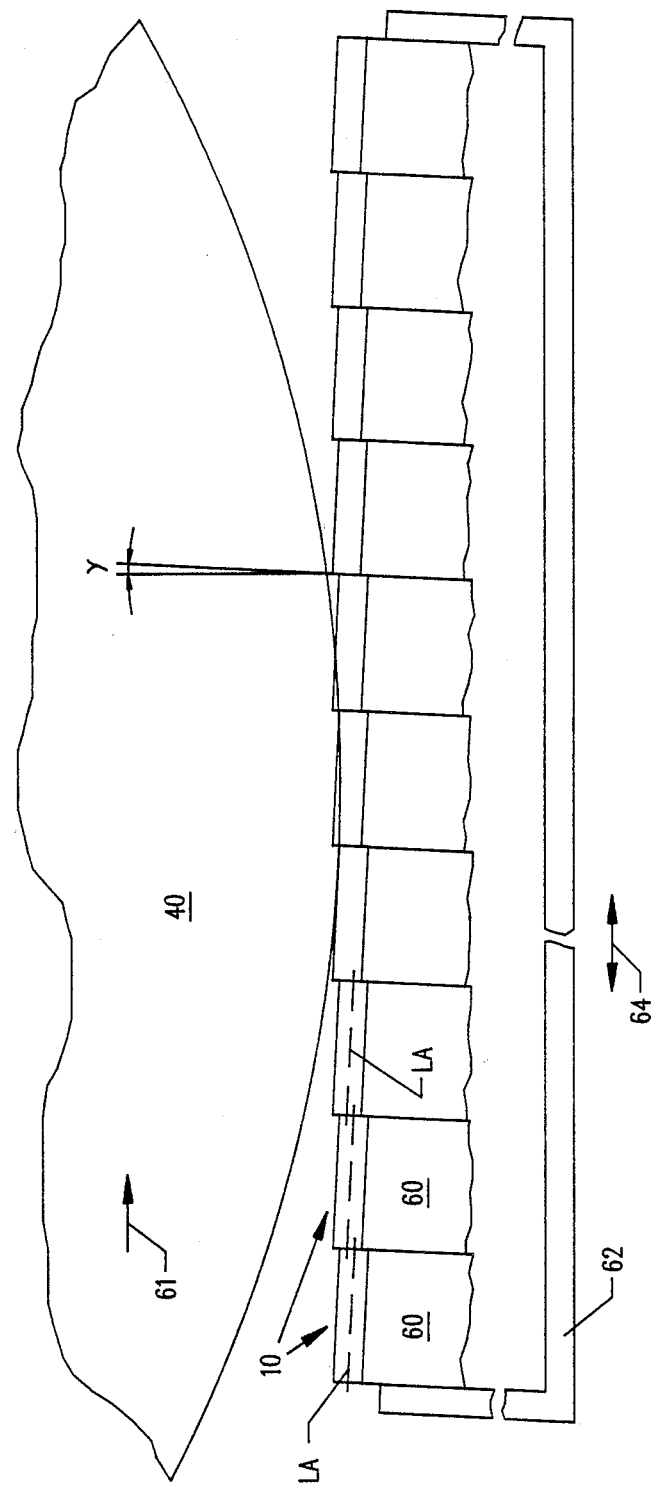
FIG. 6 is a schematic side view showing a tilted arrangement of a plurality of sliders provided on carriers and clamped together, in relation to the grinding wheel which is continuously advanced in only one direction.

As shown schematically in FIG. 6 slider 10 is fixed to a carrier 60 and arranged such that its lengths axis LA is slightly tilted out of parallelism to advance direction 61 of grinding wheel 40. As shown in FIG. 6 not only one slider 10 is provided on a carrier 60 but a plurality of sliders 10 can be provided on carriers 60 and staggered such that grinding wheel 40 can be continuously advanced in the direction of arrow 61 and still providing the trumpet-like air bearing surface form. The tilting angle $\gamma$ might have a value of about 1–2 degrees. The carriers 60 carrying slider 10 are arranged in a tilted manner and clamped together by an appropriately formed clamping and holding device 62 that can be loosened and clamped together in direction of double arrow 64. This holding and clamping device 62 is not shown in detail.

It is obvious to a person skilled in the art that the arrangement in FIG. 6 is especially suited for batch fabrication of sliders which have an air bearing surface contour in accordance with the present invention. It is furthermore obvious to a person skilled in the art and therefore not described in more detail that grinding wheel 40 is stepwise advanced sidewise to provide one rail after another. Thus for example in relation with FIG. 2 and FIG. 5 rails 12 and 14 are provided in different grinding wheel advance process steps.

While the invention has been particularly shown and described with reference to a preferred embodiment thereof, it will be understood by those skilled in the art that various other changes in the form and details may be made therein without departing from the spirit and scope of the invention.

We claim:

1. An air bearing slider for supporting a transducer comprising:
    a slider body having leading and trailing ends, sides, and an air bearing surface;
    a pair of substantially coplanar side rails disposed along the sides of said slider body to form a recessed section, open at both the leading and trailing ends of said slider, between said side rails, each of said side rails being defined by first and second edges which are spaced apart to form a coplanar air bearing surface between said edges, said first edge bordering said recessed section and said second edge bordering one of the sides of said slider body, said air bearing surface of each of said side rails having a first portion of constant width extending from the trailing end of said slider to an intermediate point, and a second portion extending from said intermediate point to said leading end of said slider, said second portion of each of said side rails having a contour that is continuously curved in both the first and said second edges with the greatest width at the leading end of the said slider, said intermediate point being near the midpoint between said leading and trailing ends of said slider.

2. The air bearing slider of claim 1 wherein said air bearing surfaces of said side rails are confined by beveled surfaces.

3. The air bearing slider of claim 2, wherein said beveled surfaces are formed at an angle between 35 and 55 degrees.

4. An air bearing slider for supporting a transducer relative to a moving record medium, said slider provided on its side directly opposite said recording medium with a pair of side rails separated by a recessed portion, said side rails extending from the leading end of said slider to its trailing end which supports said transducer, and said side rails having a tapered portion at its leading end, characterized in that:

each of said side rails having an air bearing surface, said air bearing surface comprising a first portion of increasing width, in a trumpet-like form, extending from a predetermined point within the length of said side rail towards the leading end of said slider, said first portion of said side rail having its widest dimension at the leading end of said side rail, each of said side rails having a second portion comprising an air bearing surface of equal width which extends from said predetermined point within the length of said rail towards the trailing end of said slider, said predetermined point being near the midpoint between said leading and trailing ends of said slider.

5. The air bearing slider in accordance with claim 4, wherein said air bearing surfaces are confined with oblique surfaces.

6. The air bearing slider in accordance with claim 5, wherein said oblique surfaces are formed by surfaces beveled at an angle between 35 and 55 degrees.

* * * * *